2,979,384
PROCESS FOR PRODUCTION OF HYDROGEN AND SULFUR

Joseph G. Weiner, Los Angeles, and Charles William Leggett, Alhambra, Calif., assignors to The Ralph M. Parsons Company, Los Angeles, Calif., a corporation of Nevada No Drawing. Filed Dec. 22, 1958, Ser. No. 781,869

8 Claims. (Cl. 23—212)

This invention relates to a cyclic process for the production of hydrogen and sulfur from hydrogen sulfide.

In processes for the treatment and refining of petroleum products, petrochemicals and manufactured gas, the presence of sulfur compounds in the feed material requires that various purification steps be included in the treating process. Waste gases separated by these purification steps frequently contain hydrogen sulfide in various concentrations. For example, waste gas from an amine treating process may contain from 25% to 95% hydrogen sulfide. Because of the objectionable characteristics of hydrogen sulfide, such waste gases cannot be discharged directly into the atmosphere. One expedient is to burn waste gases containing hydrogen sulfide as a flare gas or a boiler gas. The recognition that burning of waste gases results in loss of potentially-valuable by-products has led to various processes for the recovery of constituents of waste gases, as, for example, the recovery of sulfur from hydrogen sulfide contained in these gases. However, to our knowledge there has been no commercial process for the concurrent recovery of both hydrogen and sulfur from hydrogen sulfide, particularly where the hydrogen sulfide occurs as one of the constituents of a gaseous system.

In the process of our invention for producing hydrogen and sulfur from hydrogen sulfide, gaseous hydrogen sulfide is passed in contact with a lower sulfide of a metal selected from the group consisting of iron, nickel and cobalt to produce hydrogen and a higher sulfide of said metal as reaction products. The higher sulfide of the metal thereby produced is then heated to regenerate the lower sulfide of the metal and to produce vaporous sulfur. The lower sulfide of the metal produced by the second step of the process is again reacted with additional hydrogen sulfide to produce hydrogen and the higher sulfide. The steps of reacting hydrogen sulfide with a lower sulfide of the metal and decomposing the higher sulfide thereby produced to the lower sulfide so that the lower sulfide may be used in the first step of the process are cyclically repeated. As used herein to describe sulfides, the terms "lower" and "higher" refer to the relative content of sulfur in the stoichiometric composition of the sulfide. To illustrate, the following sulfides of nickel progressively increase from lower to higher sulfides: $Ni_2S$; $Ni_3S_2$; $NiS$; $Ni_3S_4$. As an example of the chemical reactions by which the process of the invention may proceed, the following reactions are illustrative:

(1) $$Co_3S_4 + 2H_2S \rightarrow 3CoS_2 + 2H_2$$

(2) $$3CoS_2 + Heat \rightarrow Co_3S_4 + S_2$$

The process of our invention is typically carried out with the monosulfide of iron, nickel or cobalt as the sulfide with which hydrogen sulfide is initially reacted. In carrying out this embodiment of the process, the concurrent production of hydrogen and sulfur from hydrogen sulfide proceeds by the following two chemical reactions:

(3) $$MeS + H_2S = MeS_2 + H_2$$

(4) $$xMeS_2 + Heat = xMeS + S_x$$

where Me represents a metal selected from the group consisting of iron, nickel and cobalt and $x$ represents the atoms of sulfur combining to form a molecule of sulfur in the gaseous state. Reaction 4 is expressed in the generalized form given since sulfur may exist in the gaseous state in the molecular forms $S_8$, $S_6$ and $S_2$, the relative amounts of these molecules varying with temperature. It is to be understood that the term "monosulfide" expressed as MeS includes also those sulfide systems having an excess of sulfur in solid solution so that instead of the stoichiometric composition MeS the true composition may be $MeS_{1+y}$ where $y$ is a value less than 1.

The description of the process of the invention which follows in terms of the use of the monosulfide of iron, nickel or cobalt as an initial reactant is not to be construed as limiting the process since the process may be carried out with those higher sulfides of iron, nickel and cobalt which, upon regeneration under appropriate conditions, produce the lower sulfides of the metal, as illustrated by Reactions 1 and 2.

From the chemical Reactions 3 and 4 set forth above, it is clear that hydrogen is produced as a reaction product in the first step of the process and that sulfur is produced as a reaction product in the second step of the process. Both of these reaction products are obtained from hydrogen sulfide and may be separately recovered by suitable separation means. The metallic monosulfide with which hydrogen sulfide is initially reacted is returned to its initial state at the completion of one cycle of the process according to the invention. Therefore, as utilized in the process of the present invention, the monosulfide, while entering into the chemical reactions of the process, is continuously used to effect the conversion of hydrogen sulfide into hydrogen and sulfur without a permanent conversion of the monosulfide to any other form. The process may be carried out where the monosulfide of iron, nickel or cobalt is in a fixed bed or moving bed reactor. Furthermore, the process is applicable to either a batch or continuous operation. As a continuous operation, for example, two beds of the monosulfide of the metal are employed. While gaseous hydrogen sulfide is passed in contact with the monosulfide of one bed to produce hydrogen and the disulfide, the disulfide in the other bed is heated to regenerate the monosulfide and to produce vaporous sulfur.

It is recognized that some aspects of the thermal decomposition of the disulfide in the manner shown by Reaction 4 to produce the monosulfide and sulfur are known to the art. However, to our knowledge this reaction has never been combined with Reaction 3 to provide a process whereby both hydrogen and sulfur are produced from hydrogen sulfide through the cyclic conversion and regeneration of a metallic monosulfide.

Several advantages are derived from the process according to the present invention. As previously described, waste gases containing hydrogen sulfide are frequently separated by purification steps in refining processes. Desulfurization of petroleum fractions is an example where such waste gases are produced. The treatment of the waste gases according to the method of the present invention not only eliminates the problem of disposal of the noxious hydrogen sulfide but produces valuable by-products of sulfur and hydrogen. Particularly in petroleum refining operations, the hydrogen thereby produced may be effectively utilized in other steps of the refining process, as for example, hydrogenation.

The advantages of the process of the present invention may be further illustrated by consideration of its application to the treatment of natural hydrocarbon gas containing hydrogen sulfide. Hydrogen sulfide is frequently found as an impurity in natural hydrocarbon gases. Because of its corrosive characteristics and odor, it is required that the concentration of hydrogen sulfide be reduced to certain minimum limits prior to marketing of the natural gas. At the present time, removal of hydrogen sulfide is frequently done by the use of organic absorbents such as ethanolamines or inorganic absorbents such as alkali carbonates, without subsequent recovery of the atomic constituents of hydrogen sulfide. Since the process of the present invention is equally applicable to gas streams containing dilute concentrations of hydrogen sulfide, the process can be directly applied to the natural gas without a prior separation of the hydrogen sulfide from the natural gas. In this manner, the objectionable hydrogen sulfide is removed from the natural gas while, at the same time, recovery of sulfur is achieved. The hydrogen produced by the process may be left in the natural gas stream.

While the process of the present invention may be practiced with the monosulfides of nickel and cobalt as well as the monosulfide of iron, or iron sulfide as it is commonly called, the description of the process in greater detail hereinafter presented is made for the use of iron sulfide as an initial reactant. Where iron sulfide is employed, the process proceeds by the following chemical reactions:

(5)  $FeS + H_2S = FeS_2 + H_2$ (6)  $2FeS_2 + Heat = 2FeS + S_2$ For convenience, the molecular sulfur produced as a product of Reaction 6 is expressed as a diatomic molecule although it is to be recognized, as previously described, that the sulfur may exist in other molecular forms in the gaseous state. It is to be understood that the description of the process of the invention with iron sulfide is in no sense to be construed as limiting the process to that metal sulfide alone.

In the practice of the process of the present invention, hydrogen sulfide gas, either substantially pure or present in dilute concentrations as a component of a gaseous system, is passed through a bed of iron sulfide in a suitable reactor. The iron sulfide may be present either in a substantially pure state, or be supported on a carrier such as bauxite, alumina or silica gel or be intermixed with an inert material such as alumina. While the yield or recovery of hydrogen per unit volume of hydrogen sulfide passing through the bed is promoted by increasing the surface area of the iron sulfide so as to increase contact between it and the hydrogen sulfide, the fineness of the grind of the bed material is balanced against flow rates and pressure drops according to well-known principles of gaseous flow through porous beds, such as catalyst beds for example.

The reaction by which hydrogen is produced by contacting hydrogen sulfide with iron sulfide can proceed at atmospheric conditions of temperature and pressure. It has been found desirable, however, to carry out the reaction by heating the iron sulfide to an elevated temperature before hydrogen sulfide is passed through the bed of iron sulfide. A temperature in the range from 500° to 1000° F. has been found desirable for carrying out the reaction. Since the reaction is exothermic, an elevated temperature is maintained in the reactor by the heat given off during the production of hydrogen without the necessity for additional heating by external means once the reaction is initiated.

While, as previously described, the process of the present invention is adaptable to either a batch or continuous mode of operation, the process offers advantages when used as a continuous process. As the hydrogen sulfide is continuously passed through the bed of iron sulfide, hydrogen gas, produced according to Reaction 5, is removed from the reactor. The hydrogen may be separated from any non-reactive constituents of the gaseous system containing hydrogen sulfide by suitable separation means. The flow of hydrogen sulfide is continued through the bed of iron sulfide until a substantial portion of the iron sulfide is converted to iron disulfide. When the amount of iron sulfide converted to the disulfide is such that the surface contact area between the feed hydrogen sulfide and the iron sulfide in the bed is sufficiently reduced to affect the yield of the reaction, the flow of hydrogen sulfide is thereupon stopped and the iron disulfide is heated to regenerate iron sulfide together with the production of vaporous sulfur. The decomposition of iron disulfide to iron sulfide absorbs approximately 25,000 calories per gram-mole at a representative regeneration temperature. An amount of heat sufficient to meet the requirements for conversion of the iron disulfide to iron sulfide and vaporous sulfur is therefore supplied prior to passing additional gaseous hydrogen sulfide in contact with the regenerated iron sulfide.

The vaporous sulfur produced by the decomposition of the iron disulfide is removed from the reaction vessel by a stream of inert gas such as carbon dioxide, nitrogen or mixtures thereof and is condensed and collected in a suitable cooling chamber. The use of an inert gas as a carrier and purging medium removes oxidizing agents from the reaction vessel and prevents conversion of the vaporous sulfur to sulfur dioxide. In the alternative, regeneration of iron sulfide may be accomplished under a vacuum condition.

The process of the present invention will be better understood from the following two examples in which hydrogen and sulfur were produced from hydrogen sulfide according to the process of the present invention. These examples merely illustrate the process of the invention and in no sense limit the invention.

*Example 1*

A tubular reactor was charged with a technical grade iron sulfide of which approximately 88% by volume had particle sizes in the range from 20 to 30 mesh and approximately 12% by volume had particle sizes in the range from 1/8″ to 20 mesh. The reactor was purged with carbon dioxide as the reactor temperature was raised to a temperature of approximately 820° F. Thereupon hydrogen sulfide gas was passed at atmospheric pressure through the reactor in contact with the iron sulfide. The hydrogen sulfide feed rate was varied from 30 cubic centimeters per minute to 114 cubic centimeters per minute. The outflow from the reactor was passed through sodium hydroxide to remove any acidic unreacted hydrogen sulfide and the unabsorbed gas was measured and tested in batch quantities and found to be hydrogen. A substantially complete stoichiometric yield of hydrogen was obtained. The flow of hydrogen sulfide was discontinued and the reactor was thereupon heated to a temperature in excess of 1300° F. at atmospheric pressure. Carbon dioxide was continuously passed through the bed during the regeneration of the iron sulfide. Condensation of the vaporous outflow yielded elemental sulfur. The reactor was cooled to a temperature of about 830° F. and hydrogen sulfide feed was again introduced through the reactor. The cycle of producing hydrogen and iron disulfide and regenerating iron sulfide with production of elemental sulfur was repeated twice with results comparable to those previously described.

*Example 2*

A tubular reactor was charged with approximately 93% by volume commercial iron pyrite ($FeS_2$) intermixed with approximately 7% by volume alumina. The reactor was heated to a temperature in excess of 1300° F. at atmospheric pressure while carbon dioxide was continuously passed through the reactor bed. Condensation of the vaporous outflow yielded elemental sulfur. The reactor was then cooled to a temperature of approximately 900° F. and gaseous hydrogen sulfide feed was passed through the reactor bed. The outflow from the reactor was passed through sodium hydroxide to remove any acidic unreacted hydrogen sulfide and the unabsorbed gas was measured and tested in batch quantities and found to be hydrogen. The cycle of regenerating iron sulfide with production of sulfur and producing hydrogen and iron disulfide was then repeated with results comparable to those previously described.

While the process of the present invention has been described as being initiated with the monosulfide of the metal, it is to be understood that such a description has been made to illustrate the basic steps of the process. As indicated by Example 2 described above, iron pyrites ($FeS_2$) may be used initially and decomposed by heating to produce iron sulfide and sulfur whereupon the cyclic steps of the process are repeated to produce hydrogen and sulfur from hydrogen sulfide. Similarly, other polysulfides of iron, nickel or cobalt may be initially decomposed to produce the monosulfide utilized in the process. As a further illustration of the initial use of another metallic compound, iron oxide may initially be reacted with hydrogen sulfide to produce reaction products according to the following reaction:

(7) $Fe_2O_3 + 3H_2S = 2FeS + 3H_2O + S$

The iron sulfide thereby produced may then be employed in the process of the present invention in the manner previously described. Such variations are within the basic concept of the present invention.

The process of the present invention has been described without reference to process conditions such as pressure, temperature, flow rate and particle size distribution of the reactant bed. The yield of hydrogen and sulfur obtained from the process of the present invention may vary with certain of these conditions and optimum conditions may exist. Accordingly, while reference to certain operating conditions has been made in conjunction with the description of the process of the present invention, it is to be understood that these conditions have been described to illustrate the operativeness of the process and in no sense should be construed to limit the applicability or scope of the process.

We claim:

1. A process for producing hydrogen and sulfur from hydrogen sulfide which process comprises the steps of passing gaseous hydrogen sulfide in contact with a lower sulfide of a metal selected from the group consisting of iron, nickel and cobalt to produce hydrogen and a higher sulfide of said metal; separating the hydrogen from the higher sulfide of the metal; heating the higher sulfide of said metal to regenerate the lower sulfide of said metal and to produce vaporous sulfur; separating the vaporous sulfur from the lower sulfide of the metal; and cyclically repeating the steps of passing gaseous hydrogen sulfide in contact with the regenerated lower sulfide of said metal and regenerating the lower sulfide of said metal by heating the higher sulfide of said metal.

2. A process for producing hydrogen and sulfur from hydrogen sulfide which process comprises the steps of passing gaseous hydrogen sulfide in contact with the monosulfide of a metal selected from the group consisting of iron, nickel and cobalt to produce hydrogen and the disulfide of said metal; separating the hydrogen from the higher sulfide of the metal; heating the disulfide of said metal to regenerate the monosulfide of said metal and to produce vaporous sulfur; separating the vaporous sulfur from the lower sulfide of the metal; and cyclically repeating the steps of passing gaseous hydrogen sulfide in contact with the regenerated monosulfide of said metal and regenerating the monosulfide of said metal by heating the disulfide of said metal.

3. A process for producing hydrogen and sulfur from hydrogen sulfide which process comprises the steps of passing gaseous hydrogen sulfide in contact at an elevated temperature with the monosulfide of a metal selected from the group consisting of iron, nickel and cobalt to produce hydrogen and the disulfide of said metal; separating the hydrogen from the higher sulfide of the metal; further heating the disulfide of said metal in an inert atmosphere to regenerate the monosulfide of said metal and to produce vaporous sulfur; separating the vaporous sulfur from the lower sulfide of the metal; and cyclically repeating the steps of passing gaseous hydrogen sulfide in contact at an elevated temperature with the regenerated monosulfide of said metal and regenerating the monosulfide of said metal by further heating the disulfide of said metal in an inert atmosphere.

4. A process for producing hydrogen and sulfur from hydrogen sulfide which process comprises the steps of passing gaseous hydrogen sulfide in contact with iron sulfide to produce hydrogen and iron disulfide; separating the hydrogen from the higher sulfide of the metal; heating the iron disulfide to regenerate iron sulfide and to produce vaporous sulfur; separating the vaporous sulfur from the lower sulfide of the metal; and cyclically repeating the steps of passing gaseous hydrogen sulfide in contact with regenerated iron sulfide and regenerating the iron sulfide by heating the iron disulfide.

5. A process for producing hydrogen and sulfur from hydrogen sulfide which process comprises the steps of passing gaseous hydrogen sulfide in contact at an elevated temperature with iron sulfide to produce hydrogen and iron disulfide; separating the hydrogen from the higher sulfide of the metal; further heating the iron disulfide in an inert atmosphere to regenerate iron sulfide and to produce vaporous sulfur; separating the vaporous sulfur from the lower sulfide of the metal; and cyclically repeating the steps of passing gaseous hydrogen sulfide in contact with regenerated iron sulfide and regenerating the iron sulfide by further heating the iron disulfide.

6. Process in accordance with claim 5 wherein gaseous hydrogen sulfide is passed in contact with iron sulfide at a temperature in the range from 500° F. to 1000° F.

7. A process for removing hydrogen sulfide from a gaseous stream and simultaneously producing hydrogen and sulfur which process comprises the steps of passing a gas stream containing hydrogne sulfide through a bed containing the monosulfide of a metal selected from the group consisting of iron, nickel and cobalt to produce hydrogen and the disulfide of said metal; and heating the disulfide of said metal to regenerate the monosulfide of said metal and to produce vaporous sulfur.

8. Process in accordance with claim 7 wherein the monsulfide of the metal selected from the group consisting of iron, nickel and cobalt is supported on a carrier selected from the group consisting of bauxite, alumina and silica gel.

References Cited in the file of this patent

UNITED STATES PATENTS

| | | |
|---|---|---|
| 1,473,723 | Fogh | Nov. 13, 1924 |
| 2,551,905 | Robinson | May 8, 1951 |
| 2,747,968 | Pigache | May 29, 1956 |

OTHER REFERENCES

Mellor: "Comprehensive Treatise on Inorganic and Theoretical Chemistry," vol. 14, pp. 205, 214, Longmans, Green and Co., N.Y., 1935.